US011582353B2

(12) United States Patent
Yang (10) Patent No.: US 11,582,353 B2
(45) Date of Patent: Feb. 14, 2023

(54) VOICE SIGNALING TRANSMISSION METHOD AND DEVICE

(71) Applicant: ZTE CORPORATION, Guangdong (CN)

(72) Inventor: Maohua Yang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 160 days.

(21) Appl. No.: 16/616,003

(22) PCT Filed: May 22, 2018

(86) PCT No.: PCT/CN2018/087828
§ 371 (c)(1),
(2) Date: Nov. 22, 2019

(87) PCT Pub. No.: WO2018/214873
PCT Pub. Date: Nov. 29, 2018

(65) Prior Publication Data
US 2020/0092426 A1     Mar. 19, 2020

(30) Foreign Application Priority Data

May 22, 2017   (CN) .......................... 201710362125.2

(51) Int. Cl.
H04M 19/04      (2006.01)
H04L 65/1106    (2022.01)
H04L 65/1104    (2022.01)

(52) U.S. Cl.
CPC ....... *H04M 19/041* (2013.01); *H04L 65/1104* (2022.05)

(58) Field of Classification Search
None
See application file for complete search history.

(56) References Cited

U.S. PATENT DOCUMENTS 8,085,915 B2 * 12/2011 Reumann .......... H04L 29/06027
                                                        379/142.05
2003/0202503 A1 * 10/2003 Inui .................... H04L 65/1101
                                                        370/352

(Continued)

FOREIGN PATENT DOCUMENTS

CN        1972340 A      5/2007
CN      101035086 A      9/2007

(Continued)

OTHER PUBLICATIONS

European Patent Office, The extended European search report dated Jan. 22, 2021 for application No. EP18806670.8.

(Continued)

*Primary Examiner* — Quoc D Tran
(74) *Attorney, Agent, or Firm* — Houtteman Law LLC (57) ABSTRACT

The present disclosure provides a voice signaling transmission method and device. The voice signaling transmission method includes: sending, by a second device, a request signaling to a first device; receiving, by the second device, a signaling for requesting the second device to try a call sent by the first device, and sending a signaling for trying a call to the first device; receiving, by the second device, a ringing signaling sent by the first device and sending a temporary response signaling to the first device; and receiving, by the second device, a signaling for confirming the response and a signaling for confirming the request which are sent by the first device and sending a response signaling to the first device.

18 Claims, 5 Drawing Sheets

(56) References Cited

U.S. PATENT DOCUMENTS

| | | | |
|---|---|---|---|
| 2009/0180463 A1* | 7/2009 | Yang | H04L 65/1069 370/349 |
| 2009/0216870 A1* | 8/2009 | Kitamura | H04L 67/125 709/223 |
| 2010/0054177 A1* | 3/2010 | Sahin | H04B 7/18582 370/316 |
| 2012/0210007 A1 | 8/2012 | Ormazabal et al. | |
| 2018/0054370 A1* | 2/2018 | Khan | H04L 43/06 |

FOREIGN PATENT DOCUMENTS

| | | | |
|---|---|---|---|
| CN | 101491057 A | 7/2009 | |
| CN | 101621517 A | 1/2010 | |
| KR | 20070014922 A | 2/2007 | |
| WO | 2007043806 A1 | 4/2007 | |
| WO | 2008044265 A1 | 4/2008 | |

OTHER PUBLICATIONS

Kueh V Y et al:"Performance analysis of session initiation protocol based call set-up over satellite-UMTS network", Computer Communication, Elsevier Science Publishers BV, Amsterdam, NL, Jul. 18, 2005.
WIPO, International Search Report dated Aug. 9, 2018.
China Patent Office, First Office Action dated Oct. 27, 2021 for application No. CN201710362125.2.

* cited by examiner

VOICE SIGNALING TRANSMISSION METHOD AND DEVICE

CROSS REFERENCE TO RELATED APPLICATION

This application is a National Phase Application filed under 35 U.S.C. 371 as a national stage of PCT/CN2018/087828, filed on May 22, 2018, an application claiming the priority of the Chinese patent application No. 201710362125.2, filed on May 22, 2017, the contents of which are incorporated herein by reference in their entirety.

TECHNICAL FIELD

The present disclosure relates to the field of mobile communications technologies, and in particular, to a voice signaling transmission method and device.

BACKGROUND

In mobile communication, a voice call flow is complex, and a voice signaling volume is too large. It is easy to generate a problem that voice signaling cannot be effectively transmitted when environment of a channel for transmitting signaling is complex. For example, in satellite communication, environment of an air interface is complex, and if a standard Session Initiation Protocol (SIP) is adopted, it is easy to generate problems that voice signaling cannot be reliably transmitted and a success rate of voice telephone service is low.

Therefore, a new technical solution for transmitting voice signaling is needed to ensure the reliability of voice information transmission.

SUMMARY

In view of the above, an object of the present disclosure is to provide a voice signaling transmission method and device, so as to overcome the problem and defect that voice signaling cannot be reliably transmitted when environment of a channel is complex.

The following technical solutions are adopted by the disclosure for solving the technical problems.

According to an aspect of the present disclosure, there is provided a signaling transmission method, including: sending, by a second device, a request signaling to a first device; receiving, by the second device, a signaling for requesting the second device to try a call sent by the first device, and sending a signaling for trying a call to the first device; receiving, by the second device, a ringing signaling sent by the first device and sending a temporary response signaling to the first device; and receiving, by the second device, a signaling for confirming the response and a signaling for confirming the request which are sent by the first device and sending a response signaling to the first device.

According to another aspect of the present disclosure, there is provided a signaling transmission method, including: receiving, by a first device, a request signaling sent by a second device and sending a signaling for requesting the second device to try a call to the second device; receiving, by the first device, a signaling for trying a call sent by the second device and sending a ringing signaling to the second device; receiving, by the first device, a temporary response signaling sent by the second device and sending a signaling for confirming the response and a signaling for confirming the request to the second device; and receiving, by the first device, a response signaling sent by the second device.

According to another aspect of the present disclosure, there is provided a signaling transmission device, including: a request module configured to send a request signaling to a first device; a call trying module configured to receive a signaling sent by the first device and requesting the signaling transmission device to try a call, and send a signaling for trying a call to the first device; a temporary response module configured to receive a ringing signaling sent by the first device and send a temporary response signaling to the first device; and a response module configured to receive a signaling for confirming the response and a signaling for confirming the request which are sent by the first device and send a response signaling to the first device.

According to another aspect of the present disclosure, there is provided a signaling transmission device, including: a call trying module configured to receive a request signaling sent by a second device and send a signaling for requesting the second device to try a call to the second device; a ringing module configured to receive a signaling for trying a call sent by the second device and send a ringing signaling to the second device; a response and request confirmation module configured to receive a temporary response signaling sent by the second device and send a signaling for confirming the response and a signaling for confirming the request to the second device; and a receiving module configured to receive a response signaling sent by the second device.

According to another aspect of the present disclosure, there is provided a computer storage medium storing a computer program which, when executed by a processor, causes the processor to perform the signaling transmission method according to the present disclosure.

BRIEF DESCRIPTION OF THE DRAWINGS

The objects, features, and advantages of the present disclosure will be further explained with reference to the accompanying drawings. In the drawings.

DETAILED DESCRIPTION

In order to make the technical problems, technical solutions and advantages to be solved by the present disclosure clearer, the present disclosure is further described in detail below with reference to the accompanying drawings and embodiments. It should be understood that the specific embodiments described herein are merely used to explain the disclosure and are not intended to limit the disclosure.

Figure 1:
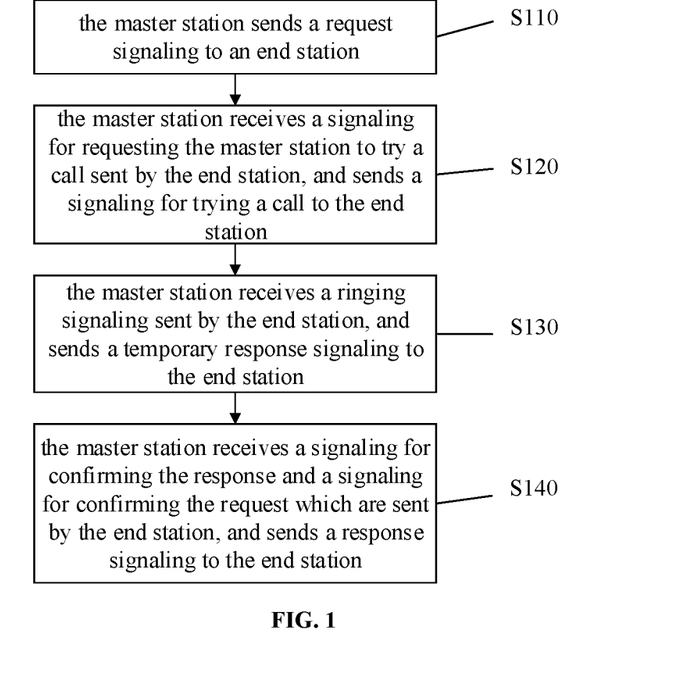
FIG. 1 is a flow chart of a voice signaling transmission method according to an embodiment of the present disclosure.

FIG. 1 is a flow chart of a voice signaling transmission method according to an embodiment of the present disclosure.

As shown in FIG. 1, the voice signaling transmission method according to the present embodiment may be applied to a master station in a satellite communication system, and the method according to the present embodiment includes steps S110 to S140.

In step S110, the master station (i.e., a second device) sends a request signaling to an end station (i.e., a first device).

In the present embodiment, when the master station communicates with the end station, the master station sends a request (INVITE), and after the end station receives the request sent by the master station, the end station sends a signaling for requesting the master station to try a call (Trying).

In step S120, the master station receives a signaling sent by the end station for requesting the master station to try a call, and sends the signaling for trying a call to the end station.

In the present embodiment, after the master station sends the signaling for trying a call, the end station sends a ringing signaling (Ringing).

In step S130, the master station receives the ringing signaling sent by the end station, and sends a temporary response signaling to the end station.

In the present embodiment, after receiving the ringing, the master station sends the temporary response signaling (Provisional Response ACKnowledgement, PRACK), and after receiving the temporary response signaling, the end station replies 200 OK (PRACK) to the master station. After the master station receives 200 OK (PRACK), the end station then sends a request response 200 OK (INVITE) confirming that the end station has received the call of the master station.

In step S140, the master station receives a signaling for confirming the response and a signaling for confirming the request which are sent by the end station, and sends a response signaling to the end station.

In the present embodiment, the master station sends a response (ACKnowledgement, ACK) signaling, that is, the whole voice call flow is completed.

Compared with the voice signaling transmission solution in the related art, the signaling transmission method according to the embodiment simplifies the transmission flow of the voice signaling, reduces the quantity of the voice signaling, and is beneficial for improving the success rate of voice signaling transmission.

Figure 2:
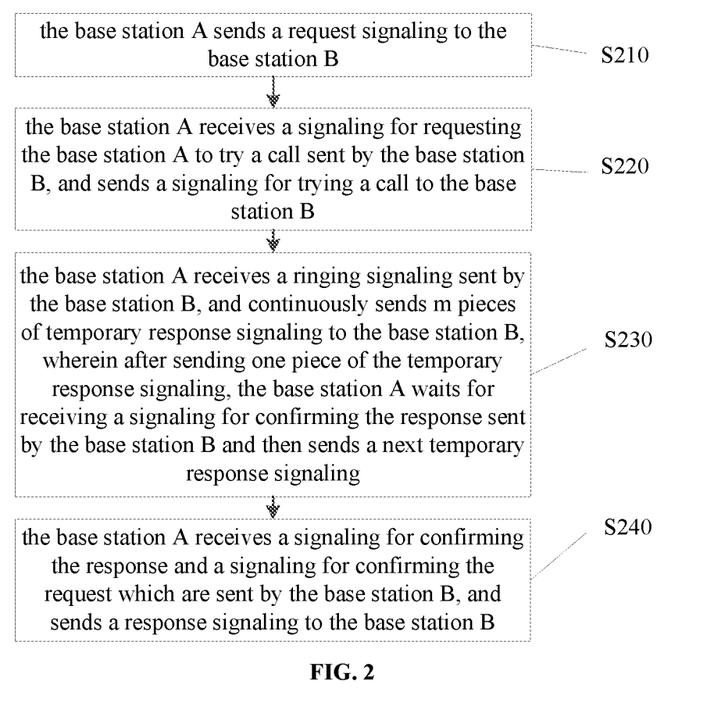
FIG. 2 is a flow chart of a voice signaling transmission method according to an embodiment of the present disclosure.

FIG. 2 is a flow chart of a voice signaling transmission method according to an embodiment of the present disclosure.

As shown in FIG. 2, the voice signaling transmission method according to the present embodiment may be applied to a base station of a microwave communication system, for example, a base station A, and the other device is another base station in the microwave communication system, for example, a base station B, and the signaling transmission method according to the present embodiment includes steps S210 to S240.

In step S210, the base station A (i.e., a second device) sends a request signaling to the base station B (i.e., a first device).

In step S220, the base station A receives a signaling for requesting the base station A to try a call sent by the base station B, and sends a signaling for trying a call to the base station B.

In step S230, the base station A receives a ringing signaling sent by the base station B, and continuously sends m (m is a positive integer) pieces of temporary response signaling to the base station B, wherein after sending one piece of the temporary response signaling, the base station A waits for receiving a signaling for confirming the response sent by the base station B, and then sends a next temporary response signaling.

In the present embodiment, after receiving the ringing sent by the base station B, the base station A may send, for example, two pieces of the temporary responses signaling (PRACK). Each time the base station B receives one piece of the temporary response signaling, 200 OK (PRACK) is replied to the base station A. The base station A sends the next temporary response signaling after receiving the 200 OK (PRACK) replied by the base station B, until the two pieces of the temporary response signaling are sent.

In step S240, the base station A receives a signaling for confirming the response and a signaling for confirming the request which are sent by the base station B, and sends a response signaling to the base station B.

In the present embodiment, after sending the second 200 OK (PRACK), the base station B sends 200 OK (INVITE) to confirm that the call from the base station A is received by the base station B. Finally, the base station A sends a response (ACK) signaling, that is, the whole voice call flow is completed.

After sending each signaling, the base station A receives a status report corresponding to the signaling, and sends a next signaling after the status report indicates that the signaling is successfully sent. The signaling sent by the base station A is any one of the request signaling, the signaling for trying a call, the temporary response signaling and the response signaling. Further, after receiving each signaling, the base station A sends a status report indicating the signaling being successfully received to the base station B. The signaling received by the base station A is any one of the signaling for requesting the base station A to try a call, the ringing signaling, the signaling for confirming the response and the signaling for confirming the request.

In the present embodiment, an Automatic Repeat-reQuest (ARQ) mechanism is introduced. Devices at the two ends of an air interface are respectively the base station A and the base station B, and the ARQ mechanism is introduced into both the base station A and the base station B to resend a wrongly sent voice signaling.

Both the base station A and the base station B at the two ends of the air interface may be used as a sending end and a receiving end. In the present embodiment, the base station A sends and the base station B receives. After sending the voice signaling message, the base station A waits for a status report from the base station B, if the status report indicates that the voice signaling message is successfully sent, a subsequent voice signaling message is sent by the base station A, and otherwise, the voice signaling message which is not successfully sent is resent by the base station A.

However, the present embodiment is not limited to the base station A sending and the base station B receiving, and may be the base station B sending and the base station A receiving. After sending the voice signaling message, the base station B waits for a status report from the base station A, if the status report indicates that the voice signaling message is successfully sent, a subsequent voice signaling message is sent by the base station B, and otherwise, the voice signaling message which is not successfully sent is resent by the base station B.

Figure 3:
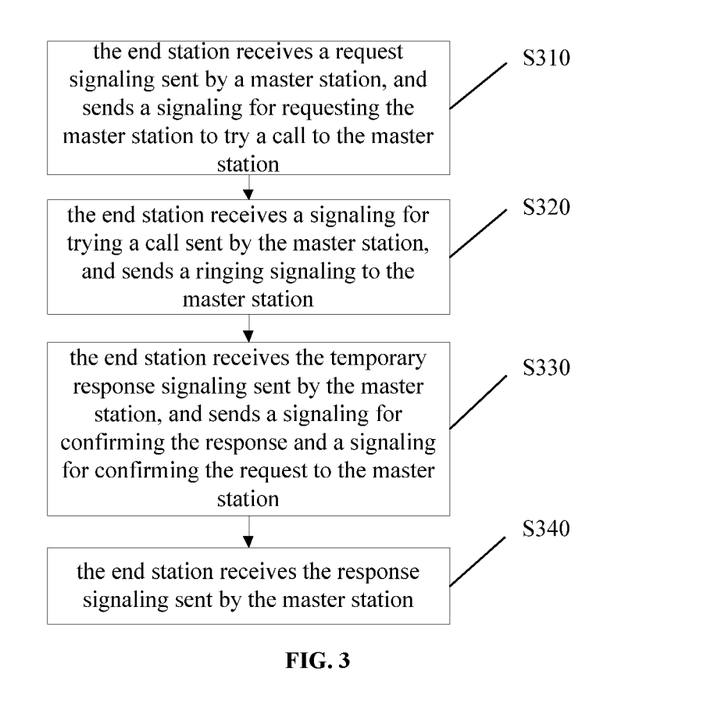
FIG. 3 is a flow chart of a voice signaling transmission method according to an embodiment of the present disclosure.

FIG. 3 is a flow chart of a voice signaling transmission method according to an embodiment of the present disclosure.

As shown in FIG. 3, the voice signaling transmission method according to the present embodiment may be applied to an end station in a satellite communication system, and the method according to the present embodiment includes steps S310 to S340.

In step S310, the end station (i.e., a first device) receives a request signaling sent by a master station (i.e., a second device), and sends a signaling, to the master station, for requesting the master station to try a call.

In the present embodiment, the master station sends a request (INVITE) when communicating with the end station.

In the present embodiment, after receiving the request sent by the master station, the end station sends the signaling for requesting the master station to try a call (Trying).

In step S320, the end station receives a signaling for trying a call sent by the master station, and sends a ringing signaling to the master station.

In the present embodiment, after the master station sends the signaling for trying a call, the end station sends the ringing signaling (Ringing), and after receiving the ringing signaling, the master station sends a temporary response signaling (PRACK).

In step S330, the end station receives the temporary response signaling sent by the master station, and sends a signaling for confirming the response and a signaling for confirming the request to the master station.

In the present embodiment, the end station receives the temporary response signaling (PRACK) sent by the master station, and replies 200 OK (PRACK) to the master station. After the master station receives 200 OK (PRACK), the end station sends a request response 200 OK (INVITE) confirming that the end station has received the call of the master station, and the master station then sends a response (ACK) signaling, that is, the whole voice call flow is completed.

In step S340, the end station receives the response signaling sent by the master station.

Figure 4:
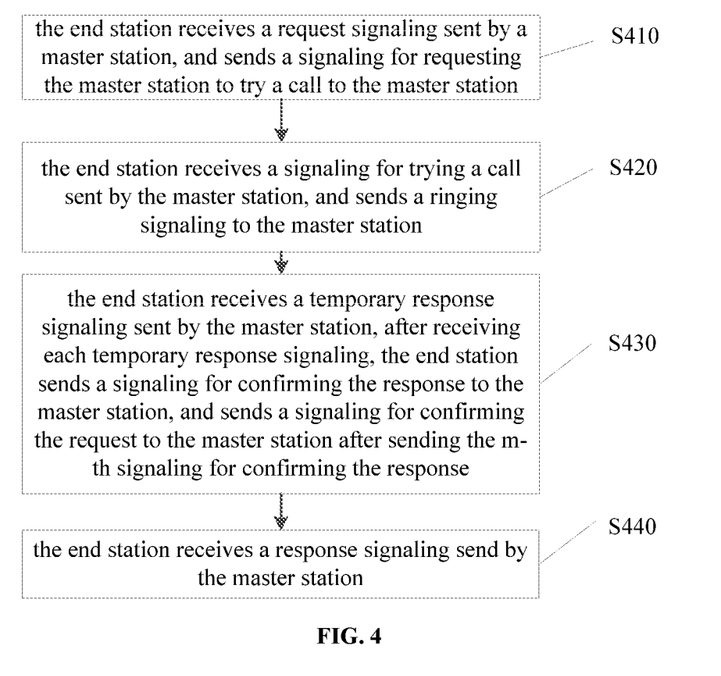
FIG. 4 is a flow chart of a voice signaling transmission method according to an embodiment of the present disclosure.

FIG. 4 is a flow chart of a voice signaling transmission method according to an embodiment of the present disclosure.

As shown in FIG. 4, the voice signaling transmission method according to the present embodiment may be applied to an end station in a satellite communication system, and the method according to the present embodiment includes steps S410 to S440.

In step S410, the end station receives a request signaling sent by a master station, and sends a signaling for requesting the master station to try a call to the master station.

In step S420, the end station receives a signaling for trying a call sent by the master station, and sends a ringing signaling to the master station.

In step S430, the end station receives a temporary response signaling sent by the master station, after receiving each temporary response signaling, the end station sends a signaling for confirming the response to the master station, and sends a signaling for confirming the request to the master station after sending the m-th (m is a positive integer) signaling for confirming the response.

In step S440, the end station receives a response signaling send by the master station.

In this embodiment, the master station may send, for example, two pieces of the temporary response signaling (PRACK) after receiving the ringing signaling. The end station replies 200 OK (PRACK) to the master station for each time the end station receiving the temporary response signaling. The master station receives 200 OK (PRACK) and then sends a next temporary response signaling, until the two pieces of the temporary response signaling have been sent. After sending the second 200 OK (PRACK), the end station then sends 200 OK (INVITE) confirming that the end station has received the call of the master station. Finally, the master station sends a response (ACK) signaling, that is, the whole voice call flow is completed.

After sending each signaling, the end station receives a status report corresponding to the signaling, and sends a next signaling after the status report indicates that the signaling is sent successfully. The signaling sent by the end station is any one of the signaling for requesting the master station to try a call, the ringing signaling, the signaling for confirming the response and the signaling for confirming the request. In addition, after receiving each signaling, the end station sends a status report indicating that the signaling has successfully received to the master station. The signaling received by the end station is any one of the request signaling, the signaling for trying a call, the temporary response signaling and the response signaling.

An ARQ mechanism is introduced in the present embodiment. Devices at the two ends of an air interface are respectively the master station and the end station, and the ARQ mechanism is introduced into both the master station and the end station to resend a wrongly sent voice signaling.

In the master station and the end station at the two ends of the air interface, the master station may be a sending end, and the end station may be a receiving end. The master station sends and the end station receives. After sending the voice signaling message, the master station waits for a status report from the end station, if the status report indicates that the voice signaling message is successfully sent, a subsequent voice signaling message is sent by the master station, and otherwise, the voice signaling message which is not successfully sent is resent by the master station.

The present embodiment is not limited to the master station sending and the end station receiving, and may be the end station sending and the master station receiving. After sending the voice signaling message, the end station waits for a status report from the master station, if the status report indicates that the voice signaling message is successfully sent, a subsequent voice signaling message is sent by the end station, and otherwise, the voice signaling message which is not successfully sent is resent by the end station.

Figure 5:
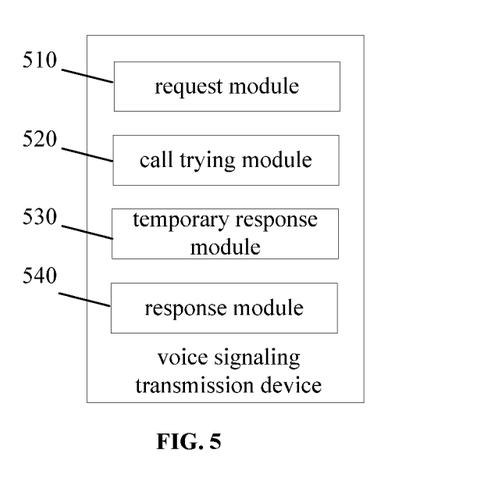
FIG. 5 is a block diagram of a voice signaling transmission device according to an embodiment of the present disclosure.

FIG. 5 is a block diagram of a voice signaling transmission device according to an embodiment of the present disclosure.

As shown in FIG. 5, the voice signaling transmission device according to the present embodiment may be applied to a master station in a satellite communication system. The signaling transmission device of the present embodiment includes a request module 510, a call trying module 520, a temporary response module 530, and a response module 540.

The request module 510 is configured to send a request signaling to an end station (i.e., a first device).

In the present embodiment, the request module 510 of the master station sends a request (INVITE) when the master station communicates with an end station. After the end station receives the request sent by the master station, the end station sends a signaling for requesting the master station to try a call (Trying).

The call trying module 520 is configured to receive the signaling for requesting the master station to try a call from the end station, and send a signaling for trying a call, to the end station.

In the present embodiment, after the master station sends the signaling for trying a call, the end station sends a ringing signaling (Ringing).

The temporary response module 530 is configured to receive the ringing signaling sent by the end station, and send a temporary response signaling to the end station.

In the present embodiment, after the master station receives the ringing signaling, the temporary response module 530 sends the temporary response signaling (PRACK). The end station replies 200 OK (PRACK) to the master station after receiving the temporary response signaling, and after the master station receives 200 OK (PRACK), the end station sends a request response 200 OK (INVITE) confirming that the end station has received the call of the master station.

The response module 540 is configured to receive a signaling for confirming the response and a signaling for confirming the request which are sent by the end station, and send a response signaling to the end station.

In the present embodiment, the master station sends a response (ACK) signaling, that is, the whole voice call flow is completed.

The voice signaling transmission device according to the embodiment may also be applied to a base station of a microwave communication system, for example, a base station A, and the other device is another base station in the microwave communication system, for example, a base station B.

The request module 510 is configured to send a request signaling to the base station B.

The call trying module 520 is configured to receive a signaling for requesting the base station A to try a call from the base station B, and send a signaling for trying a call, to the base station B.

The temporary response module 530 is configured to receive a ringing signaling sent by the base station B, and continuously sends m (m is a positive integer) pieces of temporary response signaling to the base station B, wherein after sending one piece of the temporary response signaling, the temporary response module 530 sends a next temporary response signaling after receiving a signaling for confirming the response sent by the base station B.

In the present embodiment, the temporary response module 530 may send, for example, two pieces of the temporary response signaling (PRACK) after receiving the ringing signaling sent by the base station B. Each time receiving one piece of the temporary response signaling, the base station B replies 200 OK (PRACK) to the base station A. The temporary response module 530 receives 200 OK (PRACK) replied by the base station B, and then sends the next temporary response signaling, until the two pieces of the temporary response signaling are sent.

The response module 540 is configured to receive the signaling for confirming the response and the signaling for confirming the request which are sent by the base station B, and send a response signaling to the base station B.

In the present embodiment, after sending the second 200 OK (PRACK), the base station B sends 200 OK (INVITE) to confirm that the call from the base station A is received by the base station B. Finally, the response module 540 sends a response (ACK) signaling, that is, the whole voice call flow is completed.

After sending each signaling, the base station A receives a status report corresponding to the signaling, and sends a next signaling after the status report indicates that the signaling is successfully sent. The signaling sent by the base station A is any one of the request signaling, the signaling for trying a call, the temporary response signaling and the response signaling. Further, after receiving each signaling, the base station A sends a status report indicating the signaling being successfully received to the base station B. The signaling received by the base station A is any one of the signaling for requesting the base station A to try a call, the ringing signaling, the signaling for confirming the response and the signaling for confirming the request.

In the present embodiment, an ARQ mechanism is introduced. Devices at the two ends of an air interface are respectively the base station A and the base station B, and the ARQ mechanism is introduced into both the base station A and the base station B to resend a wrongly sent voice signaling.

Both the base station A and the base station B at the two ends of the air interface may be used as a sending end and a receiving end. In the present embodiment, the base station A sends and the base station B receives. After sending the voice signaling message, the base station A waits for a status report from the base station B, if the status report indicates that the voice signaling message is successfully sent, a subsequent voice signaling message is sent by the base station A, and otherwise, the voice signaling message which is not successfully sent is resent by the base station A.

However, the present embodiment is not limited to the base station A sending and the base station B receiving, and may be the base station B sending and the base station A receiving. After sending the voice signaling message, the base station B waits for a status report from the base station A, if the status report indicates that the voice signaling message is successfully sent, a subsequent voice signaling message is sent by the base station B, and otherwise, the voice signaling message which is not successfully sent is resent by the base station B.

Figure 6:
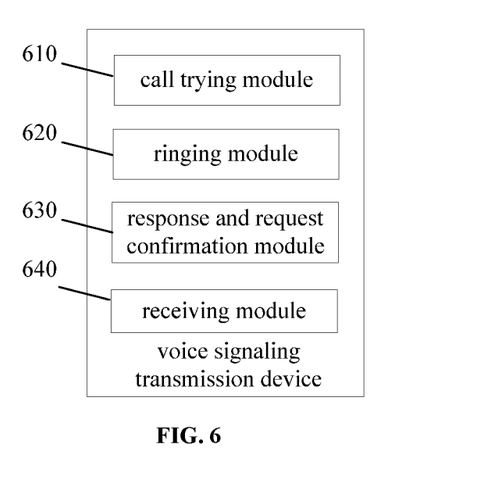
FIG. 6 is a block diagram of a voice signaling transmission device according to an embodiment of the present disclosure.

FIG. 6 is a block diagram of a voice signaling transmission device according to an embodiment of the present disclosure.

As shown in FIG. 6, the voice signaling transmission device according to the present embodiment may be applied to an end station in a satellite communication system. The signaling transmission device of the present embodiment includes a call trying module 610, a ringing module 620, a response and request confirmation module 630 and a receiving module 640.

The call trying module 610 is configured to receive a request signaling sent by a master station and send a signaling for requesting the master station to try a call to the master station.

In the present embodiment, the master station sends a request (INVITE) when communicating with the end station.

The call trying module 610 of the end station receives the request sent by the master station and then sends the signaling for requesting the master station to try a call (Trying).

The ringing module 620 is configured to receive a signaling for trying a call sent by the master station and send a ringing signaling to the master station.

In the present embodiment, after the master station sends the signaling for trying a call, the ringing module 620 sends the ringing signaling (Ringing), and after receiving the ringing signaling, the master station sends a temporary response signaling (PRACK).

The response and request confirmation module 630 is configured to receive the temporary response signaling sent by the master station, and send a signaling for confirming the response and a signaling for confirming the request to the master station.

In the present embodiment, after the response and request confirmation module 630 receives the temporary response signaling, 200 OK (PRACK) is replied to the master station, and after the master station receives 200 OK (PRACK), the response and request confirmation module 630 sends a request response 200 OK (INVITE) confirming that the end station has received the call of the master station, and the master station sends a response (ACK) signaling, that is, the whole voice call flow is completed.

The receiving module 640 is configured to receive a response signaling sent by the master station.

According to the voice signaling transmission device of the present embodiment, the response and request confirmation module 630 may be further configured to receive the temporary response signaling sent by the master station, and after receiving each temporary response signaling, the response and request confirmation module 630 sends the signaling for confirming the response to the master station, and sends the signaling for confirming the request to the master station after sending the m-th (m is a positive integer) signaling for confirming the response.

In the present embodiment, the master station may send, for example, two pieces of the temporary response signaling (PRACK) after receiving the ringing signaling. The response and request confirmation module 630 replies 200 OK (PRACK) to the master station for each time the end station receiving the temporary response signaling. The master station receives 200 OK (PRACK) and then sends a next temporary response signaling until the two pieces of the temporary response signaling have been sent. After sending the second 200 OK (PRACK), the response and request confirmation module 630 then sends 200 OK (INVITE) confirming that the end station has received the call of the master station. Finally, the master station sends a response (ACK) signaling, that is, the whole voice call flow is completed.

After sending each signaling, the end station receives a status report corresponding to the signaling, and sends a next signaling after the status report indicates that the signaling is successfully sent. The signaling sent by the end station is any one of the signaling for requesting the master station to try a call, the ringing signaling, the signaling for confirming the response and the signaling for confirming the request. In addition, after receiving each signaling, the end station sends a status report indicating that the signaling has successfully received to the master station. The signaling received by the end station is any one of the request signaling, the signaling for trying a call, the temporary response signaling and the response signaling.

An ARQ mechanism is introduced in the present embodiment. Devices at the two ends of an air interface are respectively the master station and the end station, and the ARQ mechanism is introduced into both the master station and the end station to resend a wrongly sent voice signaling.

In the master station and the end station at the two ends of the air interface, the master station may be a sending end, and the end station may be a receiving end. The master station sends and the end station receives. After sending the voice signaling message, the master station waits for a status report from the end station, if the status report indicates that the voice signaling message is successfully sent, a subsequent voice signaling message is sent by the master station, and otherwise, the voice signaling message which is not successfully sent is resent by the master station.

The present embodiment is not limited to the master station sending and the end station receiving, and may be the end station sending and the master station receiving. After sending the voice signaling message, the end station waits for a status report from the master station, if the status report indicates that the voice signaling message is successfully sent, a subsequent voice signaling message is sent by the end station, and otherwise, the voice signaling message which is not successfully sent is resent by the end station.

According to the embodiments of the present disclosure, on one aspect, a simple voice call procedure is achieved, that is, a device A communicates with a device B, the device A sends a request (INVITE), the device B receives the request sent by the device A and then sends a signaling for requesting the device A to try a call (Trying), and then the device B sends a ringing signaling (Ringing). After receiving the ringing signaling, the device A sends m (m is a positive integer) pieces of temporary response signaling (PRACK). The device B replies 200 OK (PRACK) to the device A for each time the device B receiving the temporary response signaling. The device A sends a next temporary response signaling after receiving 200 OK (PRACK), until all the m pieces of the temporary response signaling are sent. After sending the m-th 200 OK (PRACK), the device B sends 200 OK (INVITE) confirming that the device B has received the call of the device A. Finally, the device A sends a response (ACK) signaling, that is, the whole voice call flow is completed.

On the other aspect, an ARQ mechanism is introduced, and a wrong message is recovered by requesting, by a receiving party, a sending party to resend the wrong data message. By introducing the ARQ mechanism at both the sending end and the receiving end, and resending a wrong voice signaling, the reliability of voice signaling transmission can be raised. Firstly, architecture of a communication network is defined, and devices at two ends of an air interface are a device A and a device B, both of which may be used as a sending end and a receiving end. Then, the device A sends and the device B receives. After sending the voice signaling message, the device A waits for a status report from the device B, if the status report indicates that the voice signaling message is successfully sent, a subsequent voice signaling message is sent by the device A, and otherwise, the voice signaling message which is not successfully sent is resent by the device A. Alternatively, the device B may send and the device A may receive. After sending the voice signaling message, the device B waits for a status report from the device A, if the status report indicates that the voice signaling message is successfully sent, a subsequent voice signaling message is sent by the device B, and otherwise, the voice signaling message which is not successfully sent is resent by the device B.

The voice signaling transmission device according to the embodiment may be applied to a master station and an end station in a satellite communication system, and the voice signaling transmission device may include a processor, a memory and a communication bus. The communication bus is used for realizing connection communication between the processor and the memory. The processor is configured to execute programs stored in the memory to implement the voice signaling transmission method according to embodiments of the present disclosure.

An embodiment of the present disclosure provides a computer readable storage medium for use by a master station and an end station in a satellite communication system. The computer readable storage medium stores one or more programs which, when executed by one or more processors, cause the one or more processors to perform the voice signaling transmission method according to embodiments of the present disclosure.

The embodiments of the present disclosure have been described above with reference to the accompanying drawings, and it is not intent to limit the scope of the present disclosure. Those skilled in the art can implement the present disclosure in various modifications, such as features of one embodiment may be used in another embodiment to yield yet a further embodiment, without departing from the scope and spirit of the present disclosure. Any modifications, equivalents and improvements made within the technical spirit of the present disclosure should be within the scope of the present disclosure.

What is claimed is:

1. A signaling transmission method, comprising:
   sending, by a second device, a request signaling to a first device;
   receiving, by the second device, a signaling for requesting the second device to try a call sent by the first device, and sending a signaling for trying a call to the first device;
   receiving, by the second device, a ringing signaling sent by the first device after receiving the signaling for trying the call and sending a temporary response signaling to the first device after the ringing signaling is received; and
   receiving, by the second device, a signaling for confirming the response and a signaling for confirming the request which are sent by the first device and sending a response signaling to the first device,
   wherein between the receiving by the second device the signaling for requesting the second device to try a call sent by the first device to the receiving by the second device the ringing signaling sent by the first device, the second device only sends the signaling for trying a call to the first device.

2. The method of claim 1, further comprising:
   after each time of sending a signaling, receiving, by the second device, a status report corresponding to the signaling, and sending a next signaling after the status report indicates that the signaling is sent successfully, wherein the signaling is any one of the request signaling, the signaling for trying a call, the temporary response signaling and the response signaling.

3. The method of claim 1, further comprising:
   after each time of receiving a signaling sent by the first device, sending, by the second device, a status report indicating the signaling being successful received to the first device, wherein the signaling is any one of the signaling for requesting the second device to try a call, the ringing signaling, the signaling for confirming the response and the signaling for confirming the request.

4. The method of claim 1, wherein
   the first device is an end station in a satellite communication system and the second device is a master station in the satellite communication system.

5. A signaling transmission method, comprising:
   receiving, by a first device, a request signaling sent by a second device and sending a signaling for requesting the second device to try a call to the second device;
   receiving, by the first device, a signaling for trying a call sent by the second device and sending a ringing signaling to the second device after the signaling for trying the call is received;
   receiving, by the first device, a temporary response signaling sent by the second device after the ringing signaling is received and sending a signaling for confirming the response and a signaling for confirming the request to the second device; and
   receiving, by the first device, a response signaling sent by the second device,
   wherein between the sending by the first device the signaling for requesting the second device to try a call to the second device to the sending by the first device the ringing signaling to the second device, the first device only receives the signaling for trying a call sent by the second device.

6. The method of claim 5, further comprising:
   after each time of sending a signaling, receiving, by the first device, a status report corresponding to the signaling, and sending a next signaling after the status report indicates that the signaling is successfully sent, wherein the signaling is any one of the signaling for requesting the second device to try a call, the ringing signaling, the signaling for confirming the response and the signaling for confirming the request.

7. The method of claim 5, further comprising:
   after each time of receiving a signaling sent by the second device, sending, by the first device, a status report indicating the signaling being successfully received to the second device, wherein the signaling is any one of the request signaling, the signaling for trying a call, the temporary response signaling and the response signaling.

8. The method of claim 5, wherein
   the first device is an end station in a satellite communication system and the second device is a master station in the satellite communication system.

9. A signaling transmission device, comprising:
   a request module configured to send a request signaling to a first device;
   a call trying module configured to receive a signaling for requesting the signaling transmission device to try a call sent by the first device and, and send a signaling for trying a call to the first device;
   a temporary response module configured to receive a ringing signaling sent by the first device after the signaling for trying the call is received and send a temporary response signaling to the first device after the ringing signaling s received; and
   a response module configured to receive a signaling for confirming the response and a signaling for confirming the request which are sent by the first device and send a response signaling to the first device,
   wherein between the receiving by the call trying module the signaling for requesting the transmission device to try a call sent by the first device to the receiving by temporary response module the ringing signaling sent by the first device, the call trying module only sends the signaling for trying a call to the first device.

10. A non-transitory computer storage medium storing a computer program which, when executed by a processor, causes the processor to perform the signaling transmission method according to claim 1.

11. A non-transitory computer storage medium storing a computer program which, when executed by a processor, causes the processor to perform the signaling transmission method according to claim 5.

12. The method of claim 1, wherein
the first device and the second device are both base stations in a microwave communication system.

13. The method of claim 5, wherein
the first device and the second device are both base stations in a microwave communication system.

14. A signaling transmission device, comprising a processor, a memory and a communication bus used for realizing connection communication between the processor and the memory, wherein
the processor is configured to execute programs stored in the memory to perform the signaling transmission method according to claim 1.

15. A signaling transmission device, comprising a processor, a memory and a communication bus used for realizing connection communication between the processor and the memory, wherein
the processor is configured to execute programs stored in the memory to perform the signaling transmission method according to claim 5.

16. The method of claim 1, wherein the step of sending the temporary response signaling to the first device comprises:

continuously sending, by the second device, m pieces of the temporary response signaling to the first device, wherein after sending one piece of the temporary response signaling, the second device sends a next temporary response signaling after receiving the signaling for confirming the response sent by the first device, wherein m is a positive integer.

17. The method of claim 5, wherein the step of sending the signaling for confirming the response and the signaling for confirming the request to the second device comprises:
after each time of receiving the temporary response signaling sent by the second device, sending, by the first device, one piece of the signaling for confirming the response to the second device, and sending the signaling for confirming the request to the second device after sending m pieces of the signaling for confirming the response, wherein m is a positive integer.

18. The signaling transmission device of claim 9, wherein the temporary response module is configured to continuously send m pieces of the temporary response signaling to the first device, wherein after sending one piece of the temporary response signaling, the temporary response module sends a next temporary response signaling after receiving the signaling for confirming the response sent by the first device, wherein m is a positive integer.

\* \* \* \* \*